United States Patent
Lu et al.

(10) Patent No.: US 7,890,998 B2
(45) Date of Patent: Feb. 15, 2011

(54) SYSTEM AND METHOD FOR SELECTIVE AUTHENTICATION WHEN ACQUIRING A ROLE

(75) Inventors: Yantian Tom Lu, Round Rock, TX (US); Thomas Walters Drew, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/770,852

(22) Filed: Jun. 29, 2007

(65) Prior Publication Data
US 2009/0007249 A1 Jan. 1, 2009

(51) Int. Cl.
*G11C 7/00* (2006.01)

(52) U.S. Cl. ............... 726/21; 726/2; 726/3; 726/4; 726/5; 726/6; 726/7; 726/8; 726/9; 713/155; 713/156; 713/157; 713/158; 713/159; 709/223; 709/225; 709/229

(58) Field of Classification Search ............... 726/2–10, 726/21; 713/155–159; 709/223, 225, 229
See application file for complete search history.

(56) References Cited

U.S. PATENT DOCUMENTS

| | | | | |
|---|---|---|---|---|
| 5,684,950 A * | 11/1997 | Dare et al. | ...................... | 726/10 |
| 7,185,192 B1 * | 2/2007 | Kahn | .......................... | 713/155 |
| 7,546,640 B2 * | 6/2009 | Chang et al. | .................. | 726/28 |
| 2002/0026592 A1 * | 2/2002 | Gavrila et al. | .............. | 713/201 |
| 2003/0005117 A1 * | 1/2003 | Kang et al. | .................. | 709/225 |
| 2008/0313716 A1 * | 12/2008 | Park | .............................. | 726/4 |

* cited by examiner

*Primary Examiner*—Nabil M El Hady
(74) *Attorney, Agent, or Firm*—Van Leeuwen & Van Leeuwen; Matthew W. Baca

(57) ABSTRACT

A system, method, and program product is provided that provides authentication on a per-role basis in a Role-Based Access Control (RBAC) environment. When a user attempts to acquire a role, the improved RBAC system determines whether (a) no authentication is required (e.g., for a non-sensitive role such as accessing a company's product catalog), (b) a user-based authentication (e.g., password) is required, or (c) a role-based authentication (e.g., role-specific password is required).

17 Claims, 6 Drawing Sheets

SYSTEM AND METHOD FOR SELECTIVE AUTHENTICATION WHEN ACQUIRING A ROLE

BACKGROUND OF THE INVENTION

1. Technical Field

The present invention relates to a system and method that provides selective authentication when a user is acquiring a role. More particularly, the present invention relates to a system and method that allows various types of authentication, such as entry of user-centric passwords, role-centric passwords, or the like, in order for a user to acquire a particular role.

2. Description of the Related Art

Role-Based Access Control (RBAC) is an evolving technical means for controlling access to computer resources. Access is the ability to do something with a computer resource (e.g., use, change, or view). Access control is the means by which the ability is explicitly enabled or restricted in some way (usually through physical and system-based controls). Computer-based access controls can prescribe not only who or what process may have access to a specific system resource, but also the type of access that is permitted. These controls may be implemented in the computer system or in external devices.

Using RBAC, access decisions are based on the roles that individual users have as part of an organization. Users take on assigned roles. Using a banking example, roles might include teller, loan officer, supervisor, and manager. In traditional RBAC implementations, access rights are grouped by role name, and the use of resources is restricted to individuals authorized to assume the associated role. For example, within a bank the role of supervisor can include functions to perform withdrawal and deposit transactions as well as correct errors noted on customer's bank statements; and the role of teller can be limited to withdrawal and deposit transactions without the ability to correct errors with customer's accounts. The use of roles to control access can be an effective means for developing and enforcing enterprise-specific security policies, and for streamlining the security management process.

Under a traditional RBAC framework, users are granted membership into roles based on their competencies and responsibilities in the organization. The operations that a user is permitted to perform are based on the user's role. User membership into roles can be revoked easily and new memberships established as job assignments dictate. Role associations can be established when new operations are instituted, and old operations can be deleted as organizational functions change and evolve. This simplifies the administration and management of privileges; roles can be updated without updating the privileges for every user on an individual basis.

When a user is associated with a role: the user is given no more privilege than is necessary to perform the job. This concept of least privilege requires identifying the user's job functions, determining the minimum set of privileges required to perform that function, and restricting the user to a domain with those privileges and nothing more. In less precisely controlled systems, this is often difficult or costly to achieve. Someone assigned to a job category may be allowed more privileges than needed because is difficult to tailor access based on various attributes or constraints. Since many of the responsibilities overlap between job categories, maximum privilege for each job category could cause harmful access.

Under RBAC, roles can have overlapping responsibilities and privileges; that is, users belonging to different roles may need to perform common operations. Some general operations may be performed by all employees. In this situation, it would be inefficient and administratively cumbersome to specify repeatedly these general operations for each role that gets created. Role hierarchies can be established to provide for the natural structure of an enterprise. A role hierarchy defines roles that have unique attributes and that may contain other roles; that is, one role may implicitly include the operations that are associated with another role.

Organizations can establish the rules for the association of functions with roles. For example, a bank may decide that the role of teller must be constrained to the functions of withdrawals, deposits, and account balance inquiries, but not to the functions of modifying customer accounts or approving or denying loan requests.

For example, there are differences between the access needs of a teller and an accounting supervisor in a bank. An enterprise defines a teller role as being able to perform a savings deposit function. This requires read and write access to specific fields within a savings file. An enterprise may also define an accounting supervisor role that is allowed to perform customer account correction functions. These operations require read and write access to the same fields of a savings file as the teller. However, the accounting supervisor may not be allowed to initiate deposits or withdrawals but only perform corrections after the fact. Likewise, the teller is not allowed to perform any corrections once the transaction has been completed. The difference between these two roles is the functions that are executed by the different roles and the values that are written to a transaction log file.

While a traditional RBAC framework provides administrators with the capability to regulate who can perform what actions, when, from where, in what order, and in some cases under what relational circumstances, traditional RBAC schemes face certain challenges. First, in many traditional RBAC schemes, a user is granted access to all of their roles all of the time. Using a banking example of this type of RBAC system, when the account supervisor accesses the system (e.g., logs on) the supervisor has access to both teller operations and supervisor operations, even if the supervisor is currently acting in a teller capacity. This RBAC scheme poses security risks. For example, if the supervisor (acting as a teller), leaves his or her station for a brief period of time, another teller that does not have supervisor privileges can use the supervisor's system to perform unauthorized transactions.

Second, in many traditional RBAC schemes, passwords are shared amongst users in order to acquire a role. In this scheme, using the banking example, supervisors would share a "supervisor" password used to access the supervisor role operations and tellers would share a "teller" password used to access the teller role operations. This scheme is challenged by users sharing passwords which is less than secure as sensitive passwords can more easily fall into unauthorized persons' hands (e.g., when an employee is dismissed, he or she still knows the shared passwords that access various operational roles until the password is changed and re-shared amongst the remaining employees). Another challenge of this scheme is that employees need to enter passwords for each role that they acquire. For a manager or other person with authorization to perform several roles, this requires keeping track of a larger number of shared passwords. This results in employee inefficiency in keeping track of numerous shared passwords as well as poses a security risk as employees may resort to writing down the shared passwords on a piece of paper that may fall into the wrong hands.

SUMMARY

It has been discovered that the aforementioned challenges are resolved using a system, method and computer program product that provides authentication on a per-role basis. When a user attempts to acquire a role, the improved RBAC system determines whether (a) no authentication is required (e.g., for a non-sensitive role such as accessing a company's product catalog), (b) a user-based authentication (e.g., password) is required, or (c) a role-based authentication (e.g., role-specific password is required).

A role request is received for a user of a computer system. The role request corresponds to a role that the user wants to acquire (e.g., loan officer, bank supervisor, bank teller, etc.). Each of the roles corresponds to functions performed by the computer system. For example, the bank teller role can be used to accept deposits and withdrawal requests and the loan officer role can be used to perform loan functions. An authentication mode corresponding to the role request is then retrieved. In one embodiment, the authentication mode indicates either a role-based authentication requirement or a user-based authentication requirement. For example, the teller role may be setup to require a user-based authentication requirement (each teller having their own password), while the loan officer may be setup to use a role-based authentication requirement (each loan officer using a shared password to access loan officer functions). In addition, as will be explained later, some functions may require both user-based and role-based authentication requirements. For example, bank managers may be required to provide both a user-based authentication requirement (user password) as well as a bank manager authentication requirement (shared bank manager password) in order to access bank manager functions. Either a role-based authentication token (e.g., shared role password) or a user-based authentication token (e.g., user password) is requested and provided by the user based on the authentication mode requirement. If the token provided by the user matches the expected token value (e.g., password matches), then the user acquires the role and can execute functions under the role. If the token does not match, then the request is denied.

In one embodiment, when the user requests a particular function (e.g., a loan officer function) and has not yet acquired the necessary role, then the role request is automatically sent in order for the user to provide the needed authentication for the given role.

In another embodiment, some roles may not have a authentication mode. For roles not having an authentication requirement, users are automatically granted the role upon request. For example, a "customer" role may be established to view publications related to a bank. If a user requests a function corresponding to the customer role, then the customer role is automatically granted and the user is able to perform the requested function.

As mentioned earlier, some roles may include two authentication modes for both user- and a role-based authentications. In this embodiment, both the user-based authentication token (e.g., the individual bank manager's password) and the role-based authentication token (e.g., the shared bank manager password) are required before the role is granted. If either token is incorrect, then the request is denied and the role (e.g., bank manager role) is not acquired by the user.

In one embodiment the retrieval of the authentication mode is performed by sending a query request that includes the role being requested to a secured authentication process. The secured authentication process then locates the role that is being requested in a data store (e.g., a database) that includes numerous roles and the authentication mode(s) needed to acquire the various roles. The authentication mode(s) retrieved from the data store are returned and used to request the appropriate user- and/or role-based authentication tokens from the user.

In one embodiment, more than one role can be requested by the user (e.g., a teller role and a bank manager role). When retrieving the needed authentication modes, the system determines if multiple user-based authentications are needed and, if so, only requests one user-based authentication token (e.g., only requests the user's password once).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
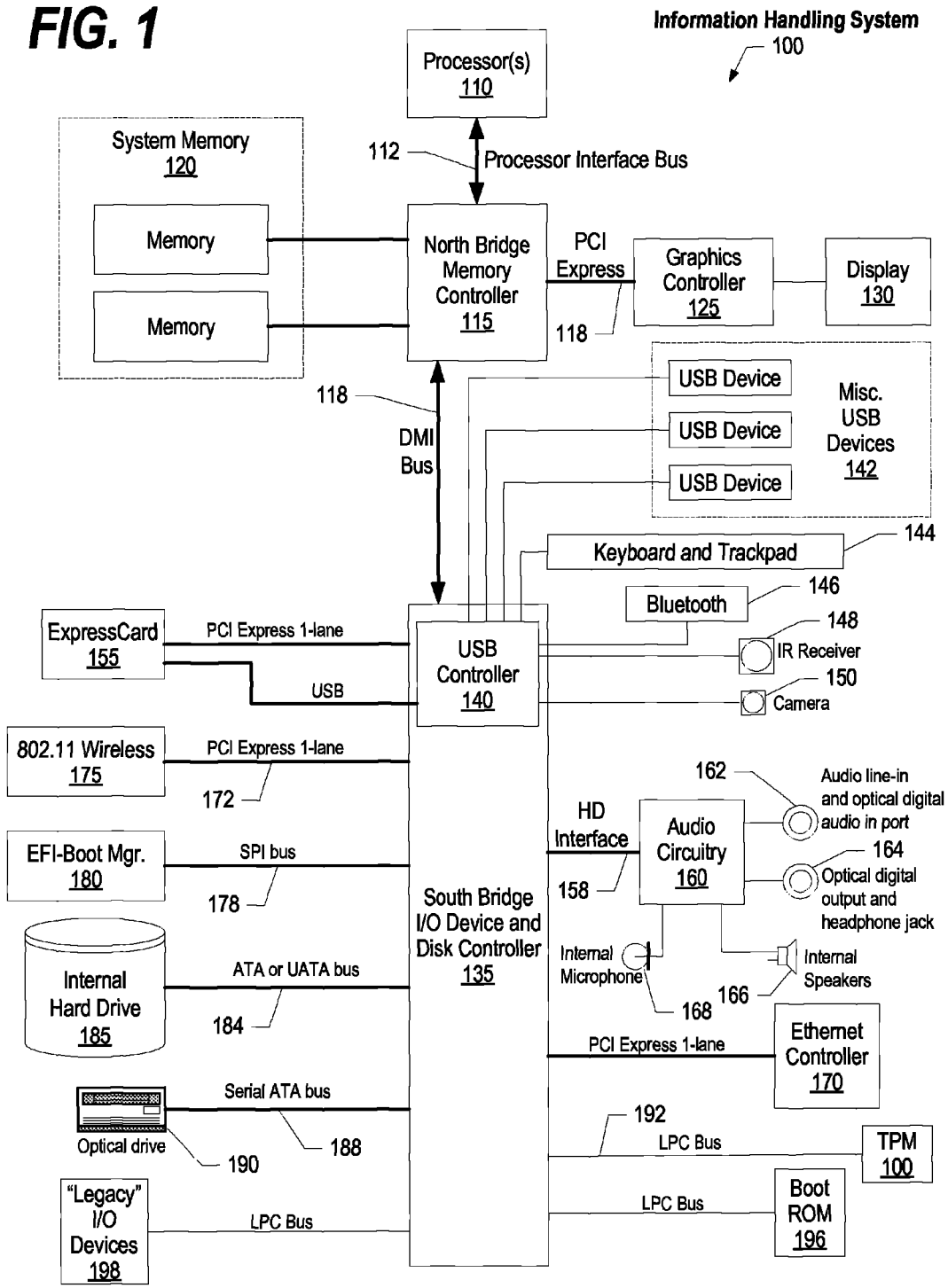
FIG. 1 is a block diagram of a data processing system in which the methods described herein can be implemented.
Figure 2:
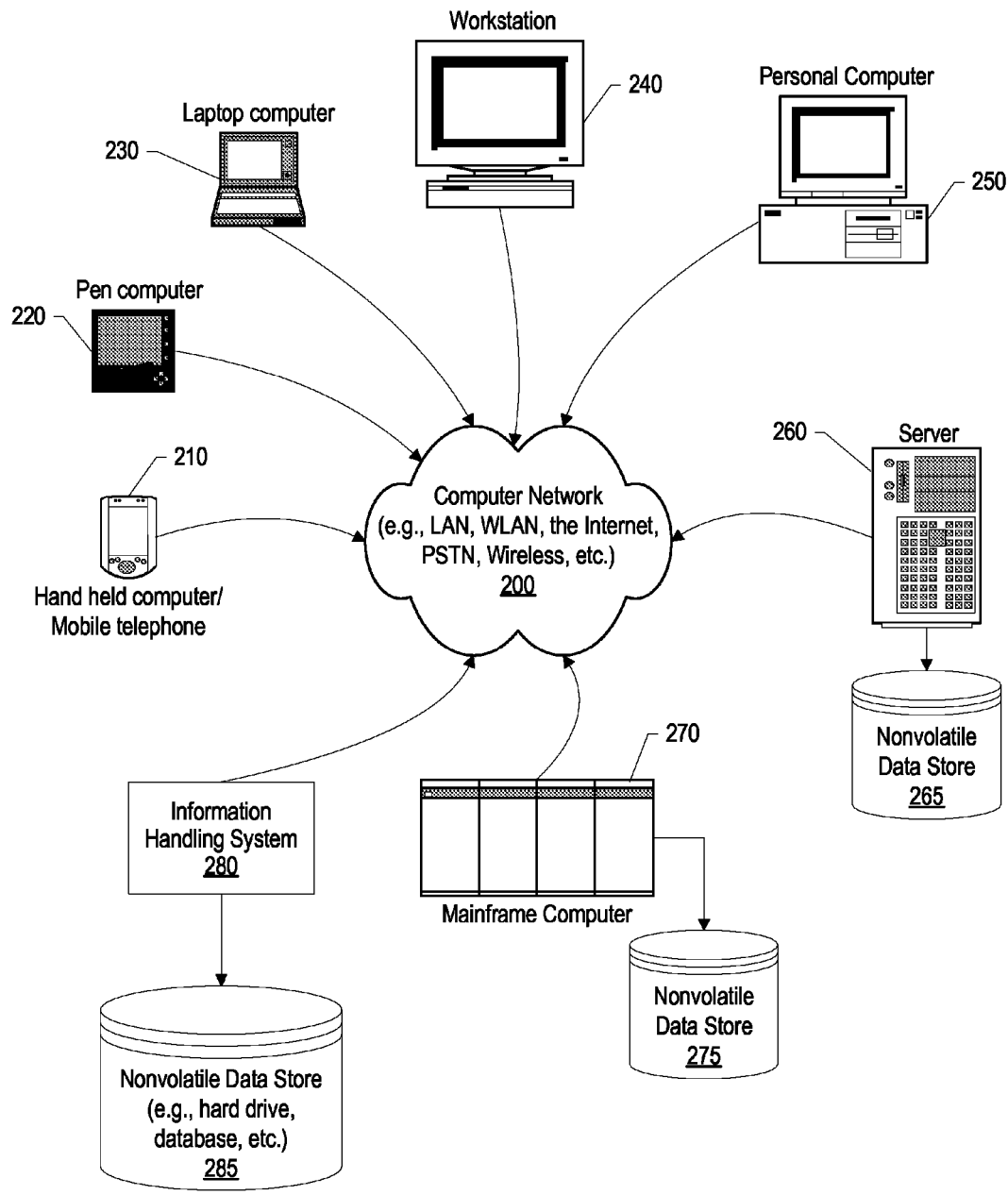
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera1) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
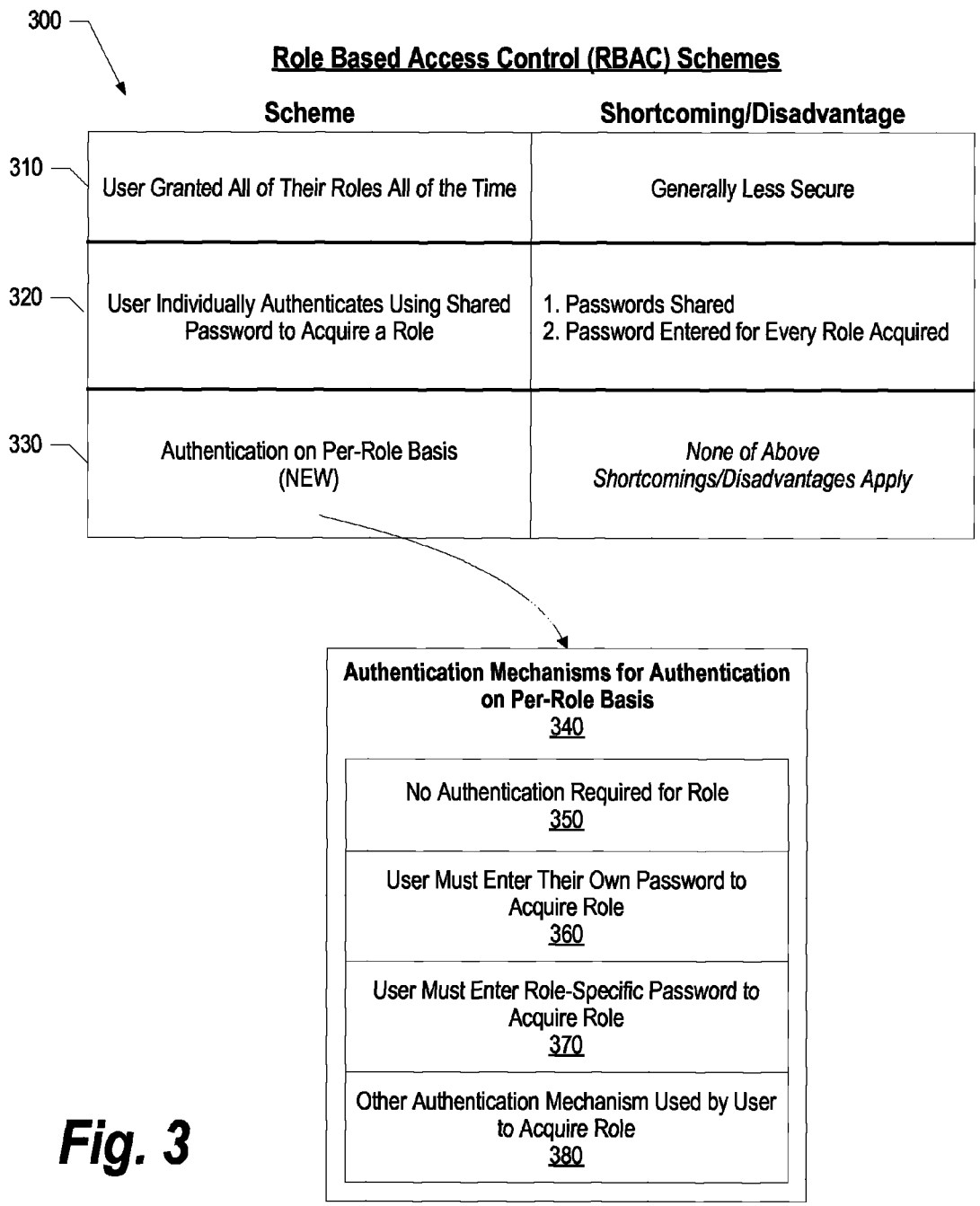
FIG. 3 is a diagram comparing various role based access control (RBAC) schemes.

FIG. 3 is a diagram comparing various role based access control (RBAC) schemes. Table 300 illustrates various RBAC schemes. The first row (310) shows the RBAC scheme where the user is granted all of their roles all of the time. The general shortcoming of this scheme is that it is less secure than other schemes. For example, if a bank manager is performing a teller role, the bank manager still uses his or her personal authentication token (e.g., the bank manager's password) to use the teller functions. If the bank manager steps away from the workstation for a moment, another employee could use the workstation to perform bank management functions above and beyond regular teller functions.

The second row (320) shows the RBAC scheme where the user individually authenticates using shared passwords for each role. Here, the shortcomings are that the passwords are all shared and that a password needs to be entered for each role being acquired by the user.

The third row (330) shows the RBAC scheme that provides authentication on a per-role basis, which is the subject of this disclosure. Authentication on a per-role basis alleviates the shortcomings shown in the first two rows (310 and 320). Table 340 illustrates various authentication mechanisms used for authenticating on a per-role basis. Entry 350 illustrates the option where no authentication is needed to acquire a role. In the banking example, a "customer" role could be established that provides a role to view various documents, such as loan rates, available to the general public. Entry 360 illustrates user-based authentication where the user is required to enter their own user-based token (e.g., password, biometric data, etc.) in order to acquire a given role. Entry 370 illustrates role-based authentication where the user is required to enter a role-based password in order to acquire a role. Entry 380 is provided to illustrate that other authentication means can be established as needed. In addition, a given role may require both a user-based authentication token (e.g., user password) and a role-based authentication token (e.g., shared role password) in order to acquire a given role.

Figure 4:
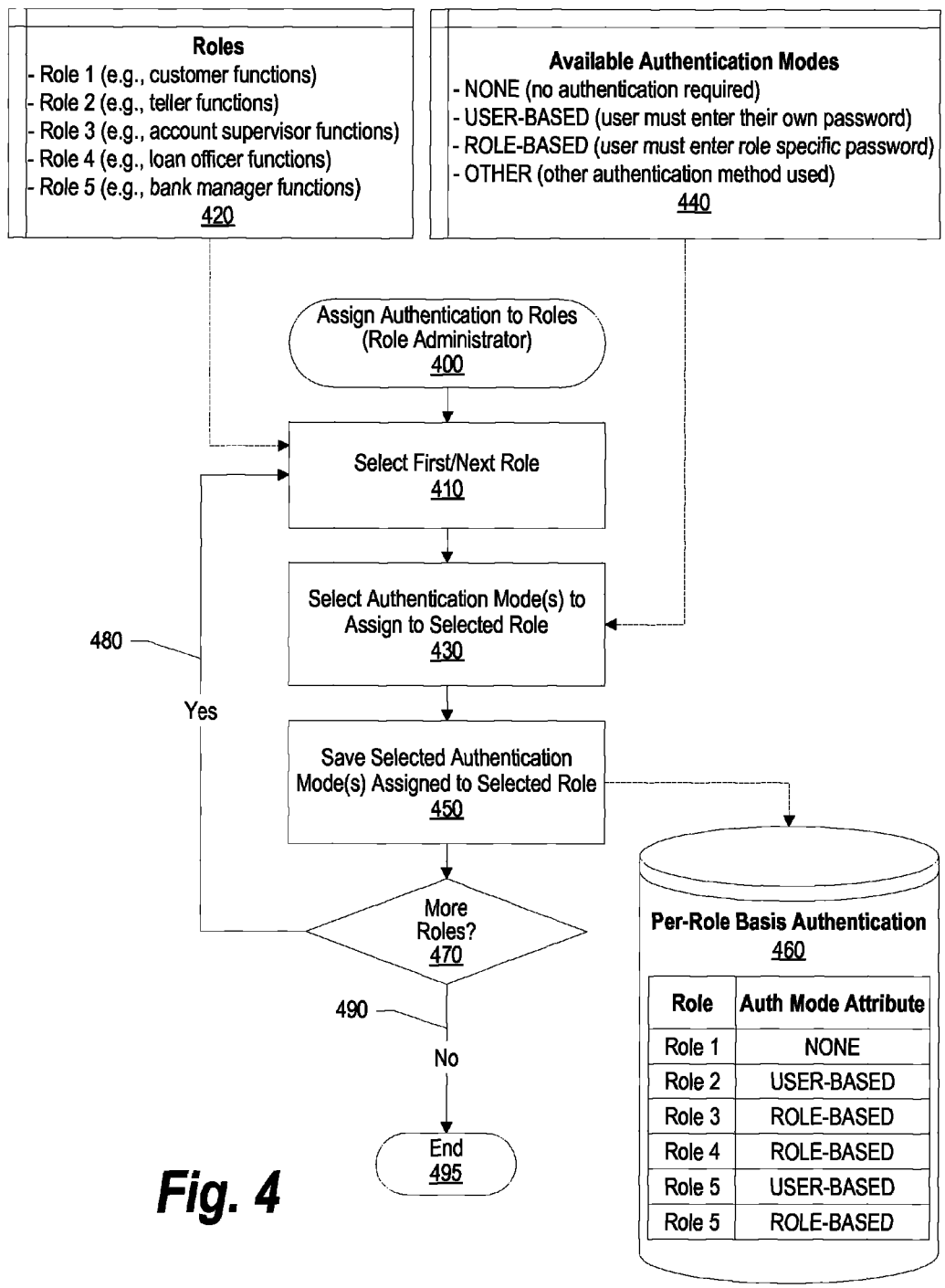
FIG. 4 is a flowchart showing the steps taken by a role administrator to create or modify a role.

FIG. 4 is a flowchart showing the steps taken by a role administrator to assign authentication modes to a role. Processing commences at 400 whereupon, at step 410, the role administrator selects the first role from Roles data store 420. Prior to assigning authentications to roles, the organization management would determine an initial set of roles that outline the various job roles in the organization along with the functions that such roles could perform. The example shows typical roles that might be found in a banking environment. Five exemplary roles are depicted. Role 1 is a "customer" role and would allow the user to perform read/only functions on publicly accessible data, such as the bank's loan rates. Role 2 is a "teller" role and would allow the user to perform teller functions such as processing deposits, withdrawals, and bank inquiries. Role 3 is an "account supervisor" role that allows the user to perform account supervisory roles such as correcting a teller error to increase or decrease a customer's account balance, but this role would not allow the user to perform traditional teller functions. Role 4 is a "loan officer" role that allows the user to perform loan functions such as taking a loan application from a customer. Finally, Role 5 is a "bank manager" function and would allow the user to perform bank management functions such as add or delete employees. In addition, one of the "bank manager" functions could be the Role Administration functions used to assign authentications to the various roles as well as to provide individual employees with particular role responsibilities.

Data store 440 shows the available authentication modes that can be assigned to the various roles stored in data store 420. Authentication modes include USER-BASED and ROLE-BASED. When USER-BASED authentication mode is assigned to a role, the user needs to provide a user-based authentication token (e.g., a user-specific password) in order to be granted access to the role. When ROLE-BASED authentication mode is assigned to a role, the user needs to provide a role-based authentication token (e.g., a role-specific password) in order to be granted access to the role. In one embodiment, an authentication mode of "none" (or blank) can be used to indicate a role where no authentication is needed, such as for "customer" role functions that are permitted by anyone without additional authentications (e.g., no authentication would be needed to view the bank's current interest rates, etc.). Finally, as the term implies, the OTHER authentication mode can be used for authentications not covered by USER-BASED, ROLE-BASED or NONE. For example, an authorization mode of BOTH could be established that requires the user to enter both the user-based authentication token (password) as well as the role-based authentication token (password). In one embodiment, the role administrator can assign multiple authentication modes to a given role. For example, to access the "bank manager" role, the role administrator may assign both the USER-BASED and ROLE-BASED authentication modes so that the user would be required to provide both their user-based authentication token (e.g., password) and the role-based authentication token (e.g., a shared role-based password, etc.) in order to acquire the bank manager role and access bank manager functions. While one example of a user-based authentication token is a password, other examples would include biometric data input (e.g., fingerprint, retina scan, etc.) or a smart card, or the like. Role-based authentication tokens can either be unique or shared passwords or can be other types of tokens such as smart cards.

At step 430, the role administrator selects one or more authentication modes from data store 440 to assign to the role selected from data store 420. At step 450, the selected authentication mode(s) are saved along with the selected role to per-role basis authentication data store 460. After the selected role and authentication mode(s) have been selected and saved, a determination is made as to whether there are more roles to assign authentication modes (decision 470). If there are more roles to assign, then decision 470 branches to "yes" branch 480 and processing loops back to select the next role (step 410) and process the newly selected role. This looping continues until there are no more roles to process, at which point decision 470 branches to "no" branch 490 and role assignment processing ends at 495.

Using the exemplary data provided, it can be seen that the "customer" role (Role 1) has been assigned "None" as the authentication mode so no authentication will be needed to acquire the customer role. The "teller" role (Role 2) has been assigned the USER-BASED authentication mode, so a user is required to enter their user-based authentication token (e.g., user-based password, biometric data, etc.) in order to acquire the teller role. The next two roles (Role 3 "account supervisor", and Role 4 "loan officer") are shown being assigned the ROLE-BASED authentication, so a user is required to enter the role-based authentication token in order to acquire either of these roles. Finally, the last role shown (Role 5 "bank manager") is shown with two assigned authentication modes (USER-BASED and ROLE-BASED), so a user is required to provide both their user-based authentication token as well as a role-based authentication token before they can acquire the bank manager role.

Figure 5:
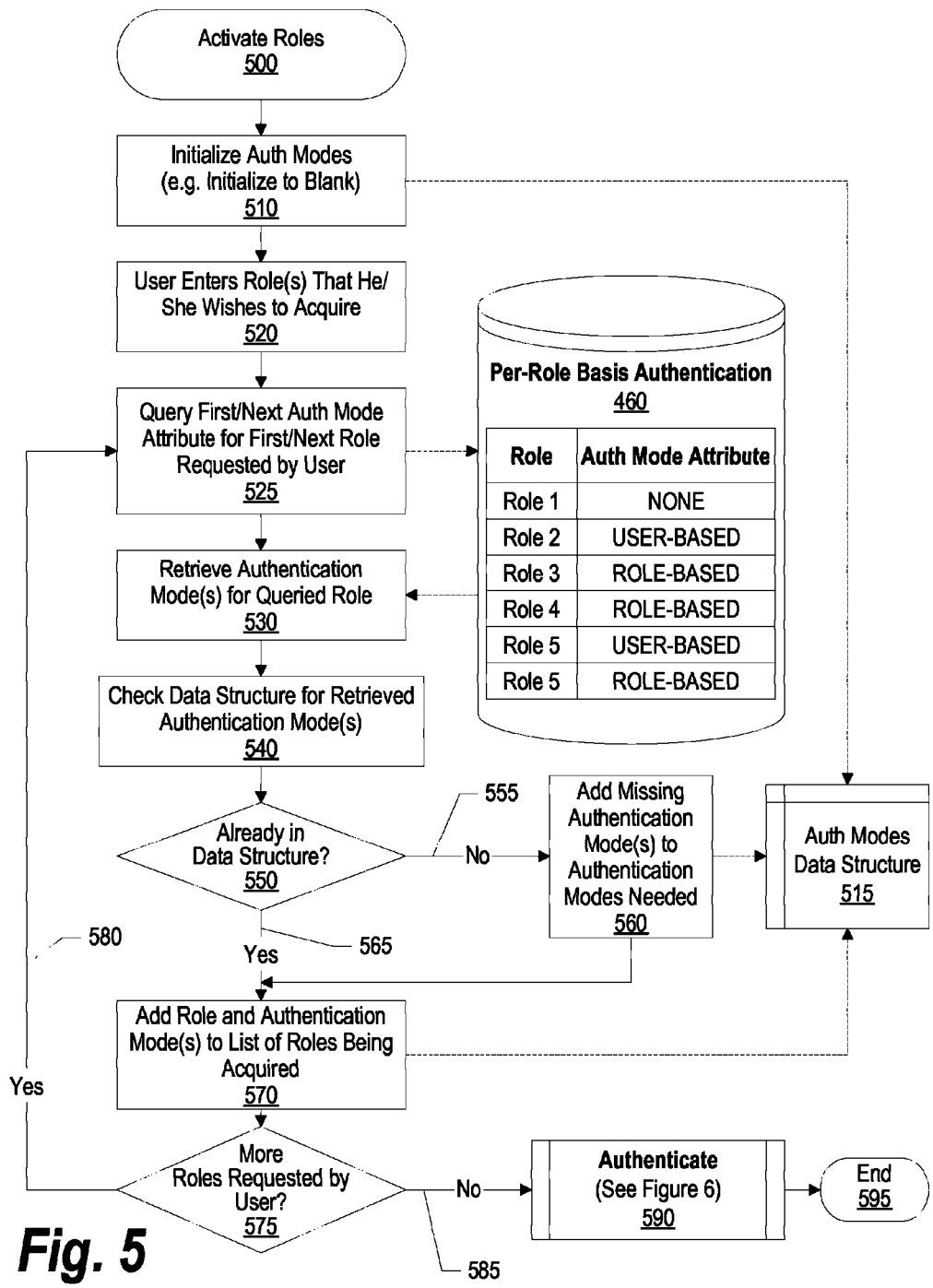
FIG. 5 is a flowchart showing the steps taken to activate a role.

FIG. 5 is a flowchart showing the steps taken to activate a role. Processing commences at 500 whereupon, at step 510, Auth Modes data structure 515 is initialized to "blank". This data structure is used to keep track of the various authentications that are required in order for the user to acquire the role(s) being requested. At step 520, the user enters one or more roles that he or she wishes to acquire. At step 525, the system queries per-role basis authentication data store 460 and provides the first (or only) role that the user has requested. At step 530, processing receives the result of the query which include any authentication modes required to acquire the role. Next, data structure 515 is checked to see if the authentication modes are already listed in the data structure. Since the data structure was initialized to blank (empty), any authentication modes retrieved in step 530 will not yet be in the data structure, but when processing subsequent requested roles, the authentication modes for subsequent roles may already be present in the data structure. In any event, a determination is made as to whether the authentication mode(s) are already in the data structure (decision 550). If they are not in the data structure, then decision 550 branches to "no" branch 555 whereupon, at step 560, any authentication modes not yet listed in the data structure are added to data structure 515. On the other hand, if the authentication modes are already listed in the data structure, then decision 550 branches to "yes" branch 565 bypassing step 560. At step 570, the role being requested by the user and the authentication modes needed to acquire the role are added to data structure 515 to provide a listing of roles being acquired so that, if the user provides the correct authentication tokens, the given roles will be acquired, and if the user provides incorrect authentication tokens for any of the requested roles, those roles will not be acquired by the user.

A determination is made as to whether there were additional roles that were requested by the user (decision 575). If there were additional roles, then decision 575 branches to "yes" branch 580 which loops back to step 525 in order to query the next role requested by the user and process the next role accordingly. This looping continues until all the roles that were requested by the user have been processed, at which point decision 575 branches to 585 and, at predefined process 590, the user is challenged to provide authentication tokens for all authentication modes listed in data structure 515 (i.e., all authentication modes needed to acquire all of the roles that were requested by the user). See FIG. 6 and corresponding text for processing details of the authenticate process. After the authenticate predefined process has been executed, processing ends at 595.

Figure 6:
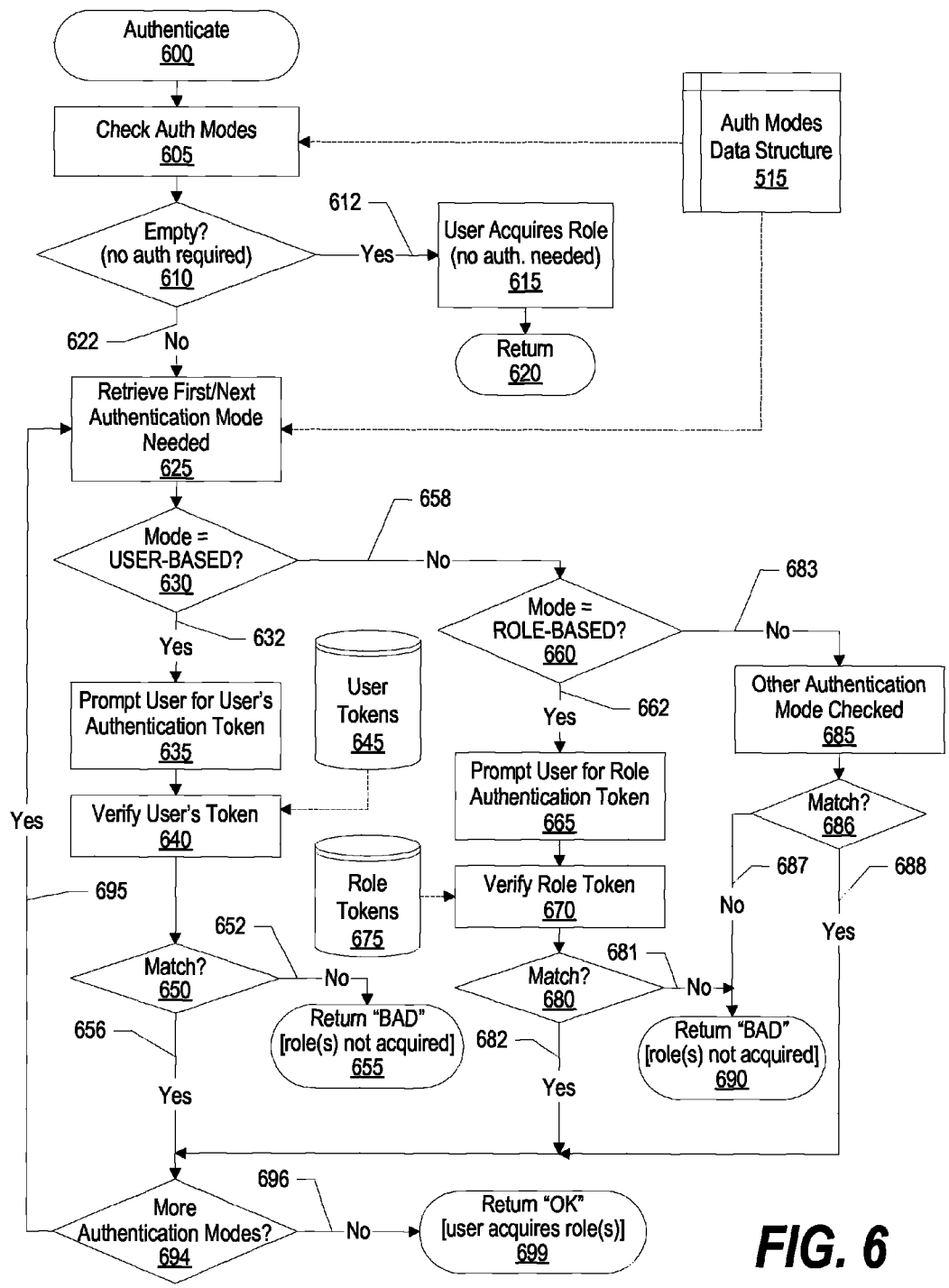
FIG. 6 is a flowchart showing detailed steps that are taken to authenticate a user to a requested role.

FIG. 6 is a flowchart showing detailed steps that are taken to authenticate a user to a requested role. Processing commences at 600 whereupon, at step 605 data structure 515 is checked. In one embodiment, data structure 515 includes the roles that the user is requesting to acquire along with the authentication mode(s) used to acquire each mode. This data is used in the processing shown in FIG. 6 both to uniquely identify the authentication modes needed so that the user will not be forced to enter the same token repeatedly, such as a user-based authentication token, that may be used for acquiring multiple requested roles. In addition, the listing of the roles being requested along with the authentication modes needed to acquire the requested roles is included in order to grant or deny requested roles based upon the authentication tokens provided by the user.

A determination is made as to whether the list of authentications needed from the user is empty (decision 610), indicating that no authentications are needed. If the list is empty, then decision 610 branches to "yes" branch 612 whereupon, at step 615, the user acquires the requested roles as none of the requested roles require the user to enter an authentication token. Processing then returns to the calling process at 620.

Returning to decision 610, if the list of needed authentications is not empty, then decision 610 branches to "no" branch 622 whereupon, at step 625, the first authentication mode needed is retrieved from data structure 515. A determination is made as to whether the retrieved authentication mode is for a USER-BASED token (decision 630). If the retrieved authentication mode is for a USER-BASED token, then decision 630 branches to "yes" branch 632 whereupon, at step 635, the user is prompted to enter his or her user-based authentication token. At step 640, an expected user-based authentication token is retrieved from data store 645. A determination is made as to whether the user-based authentication token entered by the user matches the expected user-based authentication token (decision 650). If the tokens do not match, then decision 650 branches to "no" branch 652 which returns an error return code at 655 and does not allow the user to acquire the role(s) that required the user-based authentication token. On the other hand, if the tokens match, then decision 650 branches to "yes" branch 656 and authentication processing continues.

Returning to decision 630, if the authentication mode was not for a user-based token, then decision 630 branches to "no" branch 658 whereupon, another determination is made as to whether the authentication mode is a ROLE-BASED authentication mode (decision 660). If the retrieved authentication mode is for a ROLE-BASED authentication, then decision 660 branches to "yes" branch 662 whereupon, at step 665, the user is prompted to provide the role-based authentication token corresponding to one of the requested roles. At step 670, the expected role-based authentication token is retrieved from role token data store 675. As each role that requires a role-based authentication may have a different role-based authentication token, the processing shown in steps 665 through 680 are likely to be repeated with the user prompted to enter separate role-based authentication tokens for each of the roles (e.g., the user prompted to enter the role-based authentication token for the loan officer role and the bank manager role if both of these roles was requested). At step 680, the role-based authentication token received from the user is compared to the expected role-based authentication token retrieved from data store 675. If the tokens do not match, then decision 680 branches to "no" branch 681 whereupon processing returns a bad return code at 690 and the roles requiring the role-based authentication token are not acquired. On the other hand, if the tokens match, then decision 680 branches to "yes" branch 682 and processing continues.

Returning to decision 660, if the retrieved authentication mode is not ROLE-BASED, then decision 660 branches to "no" branch 683 whereupon some other authentication mode is checked at step 685. If the other authentication mode token provided by the user does not match the expected value, then decision 686 branches to "no" branch 687 whereupon a bad return code is returned at 690 and the user does not acquire the requested role. On the other hand, if the other authentication mode token provided by the user matches the expected value, then decision 686 branches to "yes" branch 688 and authentication processing continues.

After the USER-BASED, ROLE-BASED or other authentication mode has been processed, a determination is made as to whether the data structure lists more authentication modes that need to be authenticated (decision 694). If there are additional authentication modes that need to be authenticated, then decision 694 branches to "yes" branch 695 and processing loops back to process the next unique authentication mode listed in data structure 515. Once all of the unique authentication modes have been processed, then decision 694 branches to "no" branch 696 whereupon a successful return code is returned at 699 indicating that the expected authentication token(s) were provided and the user is granted access to all of the requested role(s). The processing shown in FIG. 6 is an "all or nothing" approach that either rejects the user's role acquisition request if any of the requested authentication tokens are incorrect. Those of skill in the art will appreciate that the processing can be modified to grant access to those roles with successfully entered authentication tokens and deny access to roles with incorrectly entered authentication tokens.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

receiving a role request for a user of a computer system, wherein the role request corresponds to a plurality of selected roles requested by the user, wherein a plurality of roles were previously established on the computer system, and wherein each of the established plurality of roles corresponds to one or more functions performed by the computer system;

retrieving a plurality of authentication modes corresponding to the plurality of selected roles requested by the user, wherein each of the retrieved authentication modes either indicates a role-based authentication requirement or a user-based authentication requirement;

storing in a data structure a non-duplicate list of the plurality of authentication modes corresponding to the plurality of selected roles requested by the user;

in response to a first plurality of the retrieved authentication modes indicating the role-based authentication requirement:

receiving a plurality of role-based authentication tokens from the user, wherein each received role-based authentication token corresponds to one of the first plurality of the retrieved authentication modes;

for each received role-based authentication token, granting the user access to a requested role corresponding to the received role-based authentication token in response to the received role-based authentication token matching an expected role-based authentication token; and for each received role-based authentication token, denying the user access to the requested role corresponding to the received role-based authentication token in response to the received role-based authentication token not matching the expected role-based authentication token; and in response to a second plurality of the retrieved authentication modes indicating the user-based authentication requirement:

receiving a single user-based authentication token from the user, based on the non-duplicate list of the plurality of authentication modes in the data structure;

granting the user access to a plurality of requested roles corresponding to the received single user-based authentication token in response to the received single user-based authentication token matching an expected user-based authentication token; and denying the user access to the plurality of requested roles corresponding to the received single user-based authentication token in response to the received single user-based authentication token not matching the expected user-based authentication token.

2. The method of claim 1 further comprising:

receiving a function request from the user to execute one of the functions that corresponds to one of the established plurality of roles, wherein the role request is automatically received in response to receiving the function request.

3. The method of claim 1 wherein one of the retrieved plurality of authentication modes indicates a nonexistent role requirement, the method further comprising:

automatically granting the user access to a requested role corresponding to the nonexistent role requirement in response to the retrieved authentication mode indicating the nonexistent role authentication requirement.

4. The method of claim 1 wherein a selected role requested by the user corresponds to a selected role-based authentication requirement and a selected user-based authentication requirement, the method further comprising:

receiving both a selected role-based authentication token and a selected user-based authentication token from the user;

granting the user access to the selected role in response to the received selected role-based authentication token matching the expected role-based authentication token and the received selected user-based authentication token matching the expected user-based authentication token;

denying the user access to the selected role in response to either the received selected role-based authentication token not matching the expected role-based authentication token or the received selected user-based authentication token not matching the expected user-based authentication token.

5. The method of claim 1 wherein the single user-based authentication token is a user password and wherein each of the role-based authentication tokens is a shared role password.

6. The method of claim 1 wherein retrieving the plurality of authentication modes further comprises:

sending a query request to a secured authentication process, wherein the query request includes the roles being requested;

locating the roles being requested in a data store that includes the plurality of roles previously established on the computer system and at least role authentication modes corresponding to each of the plurality of roles; and returning, from the secure authentication process, at least one role authentication mode that corresponds to each of the roles being requested.

7. A information handling system comprising:

one or more processors;

a memory accessible by at least one of the processors;

a nonvolatile storage area accessible by at least one of the processors;

a set of instructions stored in the memory and executed by at least one of the processors in order to perform actions of:

receiving a role request for a user of a computer system, wherein the role request corresponds to a plurality of selected roles requested by the user, wherein a plurality of roles were previously established on the computer system, and wherein each of the established plurality of roles corresponds to one or more functions performed by the computer system;

retrieving a plurality of authentication modes corresponding to the plurality of selected roles requested by the user, wherein each of the retrieved authentication modes either indicates a role-based authentication requirement or a user-based authentication requirement;

storing in a data structure a non-duplicate list of the plurality of authentication modes corresponding to the plurality of selected roles requested by the user;

in response to a first plurality of the retrieved authentication modes indicating the role-based authentication requirement:

receiving a plurality of role-based authentication tokens from the user, wherein each received role-based authentication token corresponds to one of the first plurality of the retrieved authentication modes;

for each received role-based authentication token, granting the user access to a requested role corresponding to the received role-based authentication token in response to the received role-based authentication token matching an expected role-based authentication token; and for each received role-based authentication token, denying the user access to the requested role corresponding to the received role-based authentication token in response to the received role-based authentication token not matching the expected role-based authentication token; and in response to a second plurality of the retrieved authentication modes indicating the user-based authentication requirement:

receiving a single user-based authentication token from the user, based on the non-duplicate list of the plurality of authentication modes in the data structure;

granting the user access to a plurality of requested roles corresponding to the received single user-based authentication token in response to the received single user-based authentication token matching an expected user-based authentication token; and denying the user access to the plurality of requested roles corresponding to the received single user-based authentication token in response to the received single user-based authentication token not matching the expected user-based authentication token.

8. The information handing system of claim 7 wherein the set of instructions, when executed, cause at least one of the processors to perform further actions comprising:

receiving a function request from the user to execute one of the functions that corresponds to one of the established plurality of roles, wherein the role request is automatically received in response to receiving the function request.

9. The information handling system of claim 7 wherein one of the retrieved authentication modes indicates a nonexistent role requirement, wherein the set of instructions, when executed, cause at least one of the processors to perform further actions comprising:

automatically granting the user access to a requested role corresponding to the nonexistent role requirement in response to the retrieved authentication mode indicating the nonexistent role authentication requirement.

10. The information handing system of claim 7 wherein a selected role requested by the user corresponds to a selected role-based authentication requirement and a selected user-based authentication requirement, wherein the set of instructions, when executed, cause at least one of the processors to perform further actions comprising:

receiving both a selected role-based authentication token and a selected user-based authentication token from the user;

granting the user access to the selected role in response to the received selected role-based authentication token matching the expected role-based authentication token and the received selected user-based authentication token matching the expected user-based authentication token;

denying the user access to the selected role in response to either the received selected role-based authentication token not matching the expected role-based authentication token or the received selected user-based authentication token not matching the expected user-based authentication token.

11. The information handling system of claim 7 wherein retrieving the plurality of authentication modes further comprises additional instructions that, when executed, cause at least one of the processors to perform further actions comprising:

sending a query request to a secured authentication process, wherein the query request includes the roles being requested;

locating the roles being requested in a data store that includes the plurality of roles previously established on the computer system and at least role authentication modes corresponding to each of the plurality of roles; and returning, from the secure authentication process, at least one role authentication mode that corresponds to each of the roles being requested.

12. A computer program product stored in a computer readable storage medium, comprising functional descriptive material that, when executed by an information handling system, causes the information handling system to perform actions comprising:

receiving a role request for a user of a computer system, wherein the role request corresponds to a plurality of selected roles requested by the user, wherein a plurality of roles were previously established on the computer system, and wherein each of the established plurality of roles corresponds to one or more functions performed by the computer system;

retrieving a plurality of authentication modes corresponding to the plurality of selected roles requested by the user, wherein each of the retrieved authentication modes either indicates a role-based authentication requirement or a user-based authentication requirement;

storing in a data structure a non-duplicate list of the plurality of authentication modes corresponding to the plurality of selected roles requested by the user;

in response to a first plurality of the retrieved authentication modes indicating the role-based authentication requirement:

receiving a plurality of role-based authentication tokens from the user, wherein each received role-based authentication token corresponds to one of the first plurality of the retrieved authentication modes;

for each received role-based authentication token, granting the user access to a requested role corresponding to the received role-based authentication token in response to the received role-based authentication token matching an expected role-based authentication token; and for each received role-based authentication token, denying the user access to the requested role corresponding to the received role-based authentication token in response to the received role-based authentication token not matching the expected role-based authentication token; and in response to a second plurality of the retrieved authentication modes indicating the user-based authentication requirement:

receiving a single user-based authentication token from the user, based on the non-duplicate list of the plurality of authentication modes in the data structure;

granting the user access to a plurality of requested roles corresponding to the received single user-based authentication token in response to the received single user-based authentication token matching an expected user-based authentication token; and denying the user access to the plurality of requested roles corresponding to the received single user-based authentication token in response to the received single user-based authentication token not matching the expected user-based authentication token.

13. The computer program product of claim 12 further comprising functional descriptive material that causes the data processing system to perform additional actions comprising:

receiving a function request from the user to execute one of the functions that corresponds to one of the established plurality of roles, wherein the role request is automatically received in response to receiving the function request.

14. The computer program product of claim 12 wherein one of the retrieved authentication modes further indicates a nonexistent role requirement and the functional descriptive material that causes the data processing system to perform additional actions comprising:

automatically granting the user access to a requested role corresponding to the nonexistent role requirement in response to the retrieved authentication mode indicating the nonexistent role authentication requirement.

15. The computer program product of claim 12 wherein a selected role requested by the user corresponds to a selected role-based authentication requirement and a selected user-based authentication requirement, further comprising functional descriptive material that causes the data processing system to perform additional actions comprising:

receiving both a selected role-based authentication token and a selected user-based authentication token from the user;

granting the user access to the selected role in response to the received selected role-based authentication token matching the expected role-based authentication token and the received selected user-based authentication token matching the expected user-based authentication token;

denying the user access to the selected role in response to either the received selected role-based authentication token not matching the expected role-based authentication token or the received selected user-based authentic ation token not matching the expected user-based authentication token.

16. The computer program product of claim 12 wherein the single user-based authentication token is a user password and wherein each of the role-based authentication tokens is a shared role password.

17. The computer program product of claim 12 wherein retrieving the plurality of authentication modes further comprises additional functional descriptive material that causes the data processing system to perform additional actions comprising:

sending a query request to a secured authentication process, wherein the query request includes the roles being requested;

locating the roles being requested in a data store that includes the plurality of roles previously established on the computer system and at least role authentication modes corresponding to each of the plurality of roles; and returning, from the secure authentication process, at least one role authentication mode that corresponds to each of the roles being requested.

* * * * *